J. P. HASKINS.
Improvement in Springs for Bed-Bottoms.
No. 130,579.          Patented Aug. 20, 1872.
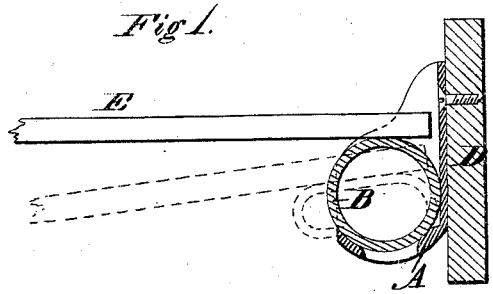
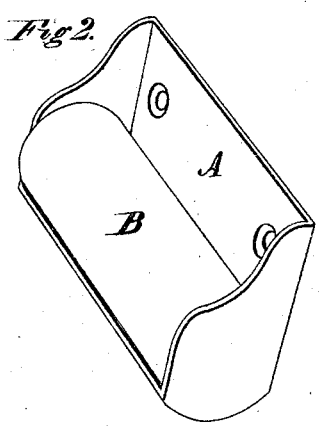
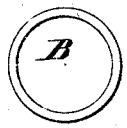 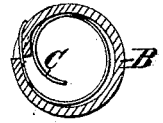
Witnesses.
Harry King
W. W. Dodge
Inventor.
J. P. Haskins
by
Dodge & Munn
his Atty's

UNITED STATES PATENT OFFICE.

J. PRESTON HASKINS, OF SARATOGA SPRINGS, NEW YORK.

IMPROVEMENT IN SPRINGS FOR BED-BOTTOMS.

Specification forming part of Letters Patent No. 130,579, dated August 20, 1872.

SPECIFICATION.

*To all whom it may concern:*

Be it known that I, J. PRESTON HASKINS, of Saratoga Springs, in the couty of Saratoga and State of New York, have invented certain Improvements in Springs for Bed-Bottoms, of which the following is a specification, reference being had to the accompanying drawing.

My invention consists in a metallic cup-shaped bracket, provided with a rubber spring, to be applied to bedsteads for supporting-slats, whereby a very simple and cheap spring bed is produced, as hereinafter explained.

Figure 1 is a vertical section of the device, as applied to the rail of a bedstead. Fig. 2 is a perspective view of the bracket with the spring in it. Figs. 3 and 4 are transverse sections of springs.

To construct my improved device I first provide a series of brackets, made, preferably, of cast-iron, of the form represented in Fig. 2. It is straight on its back, and provided with screw-holes for securing it in place, as represented in Fig. 1. Its bottom is rounded and hollowed out, or made concave on its upper side, and to render it lighter it may be perforated or made of a skeleton form.

The spring B consists simply of a tubular piece of rubber similar to rubber hose, the same being made of the proper size and cut into suitable lengths to fit snugly into the concave portion of the bracket A, as represented in Fig. 2. In making these springs I also propose to insert a flat steel spring, C, which will have one end fastened to the rubber, while its other end is left free, as represented in Fig. 4. A series of these brackets, with their springs, are to be secured at suitable intervals along the head and foot rails of the bed, and then a series of slats E placed thereon, as represented in Fig. 1. When thus arranged the slats are free to play independently of each other, and at the same time the rubber itself acts as a spring, thus making a very elastic bed at a trifling expense.

Another great advantage of this plan is, that the bed is rendered entirely noiseless, the rubber preventing the squeaking and creaking so common in ordinary spring bed-bottoms, and which is a great objection.

Having thus described my invention, what I claim is—

1. The bracket A, constructed substantially as described, in combination with the rubber spring B, arranged to operate as and for the purpose set forth.

2. The tubular rubber spring, having the metal spring C applied thereto, substantially as described.

J. PRESTON HASKINS.

Witnesses:
J. S. LEAKE,
JOHN C. SHEPHERD.